United States Patent
Ha

(10) Patent No.: US 9,877,502 B2
(45) Date of Patent: Jan. 30, 2018

(54) FOOD DEHYDRATOR

(71) Applicant: Weh Gu Ha, Seoul (KR)

(72) Inventor: Weh Gu Ha, Seoul (KR)

( * ) Notice: Subject to any disclaimer, the term of this patent is extended or adjusted under 35 U.S.C. 154(b) by 702 days.

(21) Appl. No.: 14/339,709

(22) Filed: Jul. 24, 2014

(65) Prior Publication Data

US 2015/0257431 A1  Sep. 17, 2015

(30) Foreign Application Priority Data

Mar. 14, 2014 (KR) .............................. 2014-0030403
Jun. 19, 2014 (KR) .............................. 2014-0075030

(51) Int. Cl.
*A23L 3/40*        (2006.01)
*F26B 9/06*        (2006.01)
*F26B 9/00*        (2006.01)

(52) U.S. Cl.
CPC ............. *A23L 3/40* (2013.01); *F26B 9/003* (2013.01); *F26B 9/066* (2013.01); *F26B 2200/02* (2013.01)

(58) Field of Classification Search
CPC .. A23L 3/40; F26B 9/003; F26B 9/066; F26B 2200/02
USPC ........... D7/350.3, 350.1, 356, 347, 331, 323, D7/368; 34/202, 218, 219, 224, 225, 34/232, 233, 237, 238, 86; 99/467, 473, 99/474; 126/15 R, 15 A, 21 R, 21 A, 193
See application file for complete search history.

(56) References Cited

U.S. PATENT DOCUMENTS

| | | | |
|---|---|---|---|
| 6,085,442 A * | 7/2000 | Erickson | A23L 3/40 34/211 |
| 2013/0233185 A1 | 9/2013 | Hunt et al. | |
| 2013/0326902 A1 | 12/2013 | Barrows | |
| 2015/0257432 A1 * | 9/2015 | Leavitt | A23L 3/40 34/267 |

* cited by examiner

*Primary Examiner* — Jianying Atkisson
*Assistant Examiner* — Tavia Sullens
(74) *Attorney, Agent, or Firm* — Rabin & Berdo, P.C.

(57) ABSTRACT

The present invention relates to a food dehydrator including: a body having a front door detachably mounted on the front surface thereof, a plurality of air inlet holes formed on the rear surface thereof and a plurality of body air discharge holes formed on the side surfaces thereof; an inner casing having a dry room formed at the internal space thereof, a plurality of inner casing air inlet holes formed on the rear surface thereof, a plurality of first air outlet holes and second air outlet holes formed on the side surfaces thereof; a fan adapted to supply the external air to the dry room; and a heating member disposed behind the fan along an air flowing path so as to heat the air supplied to the dry room.

8 Claims, 6 Drawing Sheets

FOOD DEHYDRATOR

BACKGROUND OF THE INVENTION

Field of the Invention

The present invention relates to a food dehydrator that can simply dry all kinds of food, such as fruit, vegetables, agricultural products, meat, fish, and so on.

Background of the Related Art

Conventional food drying is carried out in open places exposed to air and sun, but recently, food drying is conducted through a mechanical food dehydrator.

Such food dehydrator is configured wherein in a state wherein a plurality of shelves on which food to be dried are put is inserted thereinto, air is absorbed from inlets and circulated entirely in the food dehydrator by using a fan driven by a motor. In this case, it is very important that the internal air in the food dehydrator which is raised in humidity due to water vapor should be discharged to the outside and at the same time dry and fresh external air should be introduced into the food dehydrator. Accordingly, the food dehydrator generally has air inlet holes formed on the lower end thereof and air outlet holes formed on the top cover thereof, thus providing an air circulation system wherein ventilation is carried out by means of natural convection.

For example, as disclosed in U.S. Patent Application Serial Nos. US 2013/0326902 A1 and US 2013/0233185 A1, most of conventional food dehydrators have air inlet holes, a heat source and a fan disposed on the lower portion of a food dehydrator body, a plurality of dry stands disposed vertically in the inside of the body, and air outlet holes formed on the top of the body. Accordingly, the air introduced and heated from the lower portion of the food dehydrator is passed vertically through the dry stands sequentially and dries the food put on the dry stands.

At this time, the air around the dry stand close to the heat source becomes the warmest air and the most dry air, and the air becomes cold and humid toward the upper side dry stand. Accordingly, the closest food to the air supply source is very dried, but the most distant food from the air supply source is more slowly dried, so that drying qualities are different in accordance with the positions of the dry stands, thus undesirably increasing an amount of power consumed.

Further, the conventional food dehydrator may cause the water drops of food falling from the dry stands to pollute the motor and the heat wires of the heat source located at the lower portion thereof, and particularly, if drying for meat is conducted, fire danger may exist due to the lipid droplets generated from the meat.

Further, generally coil type heat wires are exposed directly to the food to be dried, thus causing irregular drying and making it hard to maintain the drying temperature of the food constantly.

SUMMARY OF THE INVENTION

Accordingly, the present invention has been made in view of the above-mentioned problems occurring in the prior art, and it is an object of the present invention to provide a food dehydrator that adopts an air flowing system wherein air is introduced from the rear surface thereof in such a manner as to be moved forwardly and circulates a portion of the wet steam discharged from a dry room to the dry room again, without discharging to the outside, thus providing a good quality of drying, excellent drying efficiencies, and substantially reduced power consumption.

It is another object of the present invention to provide a food dehydrator wherein an inner plate made of stainless steel is disposed on the inner side of a front door so as to evenly provide the wavelength of light for the whole food by using the scattered reflection of light generated from a heating member, thus enhancing the dry efficiency.

To accomplish the above-mentioned objects, according a first aspect of to the present invention, there is provided a food dehydrator including: a body having a front door detachably mounted on the front surface thereof, a plurality of air inlet holes formed on the rear surface thereof so as to introduce external air therethrough, and a plurality of body air discharge holes formed on the lower portions of the side surfaces thereof so as to discharge internal air to the outside therethrough; an inner casing disposed spaced apart from the body by a given distance inside the body and having a dry room formed at the internal space thereof, a plurality of inner casing air inlet holes formed on the rear surface corresponding to the air inlet holes, a plurality of first air outlet holes formed on the upper portions of the side surfaces thereof, and a plurality of second air outlet holes formed on the lower portions of the side surfaces thereof; a fan operated by means of a driving motor so as to supply the external air to the dry room; and a heating member disposed behind the fan along an air flowing path so as to heat the air supplied to the dry room, wherein the air introduced into the dry room and evaporating water from food is partially escaped from the second air outlet holes of the inner casing and discharged to the outside through the body air discharge holes, while being partially escaped from the first air outlet holes of the inner casing, passed through the air flowing path between the body and the inner casing, and introduced again into the dry room through the inner casing air inlet holes of the inner casing.

According to the present invention, desirably, in the space portion between the side surfaces and a portion of the rear surface of the body and the side surfaces and a portion of the rear surface of the inner casing, first air guide members are disposed to guide the air discharged from the first air outlet holes to the inner casing air inlet holes and second air guide members are disposed to guide the air discharged from the second air outlet holes to the body air discharge holes.

According to the present invention, desirably, the driving motor is disposed in the space portion between the rear surface of the body and the rear surface of the inner casing, and the fan and the heating member are disposed in the dry room at the positions corresponding to the inner casing air inlet holes of the inner casing.

According to the present invention, desirably, in the space portion between the top surface of the body and the top surface of the inner casing, a control module is disposed to control the operations of the fan and the heating member, and on the top of the external surface of the body, an operating button is disposed connectedly to the control module in such a manner as to exchange signals with each other.

According to the present invention, desirably, a light source is disposed in the space portion between the top surface of the body and the top surface of the inner casing, and a rounded square light slot is formed on the center portion of the top of the external surface of the body so as to allow the light generated from the light source to be seen to the outside.

According to the present invention, desirably, a plurality of stepped protrusions is formed by height on the inner side surfaces of the inner casing so as to receive and support a plurality of dry stands on which the food is placed.

According to the present invention, desirably, an inner plate made of stainless steel is disposed on the inner surface of the front door.

According to the present invention, desirably, a filter is mounted on the inner surface of the body corresponding to the air inlet holes so as to remove foreign matters from the introduced air.

According to the present invention, desirably, the heating member includes at least any one of an infrared lamp, a halogen lamp, a carbon lamp, a nichrome wire, and a sheath heater.

To accomplish the above-mentioned objects, according a second aspect of to the present invention, there is provided a food dehydrator including: a body having a dry room formed at the internal space thereof, a front door detachably mounted on the front surface thereof, a plurality of air inlet holes formed on the rear surface thereof so as to introduce external air therethrough, and a plurality of body air discharge holes formed on the lower portions of the side surfaces thereof so as to discharge internal air to the outside therethrough; a fan disposed at the inside of the body so as to supply the external air introduced into the air inlet holes to the dry room; and a heating member disposed behind the fan so as to heat the air supplied thereto, wherein an upper flowing space portion and a lower flowing space portion are formed between the body and the dry room, so that when the air introduced into the dry room and evaporating water from food is escaped from the dry room, a portion of the air is passed through the lower flowing space portion and discharged to the outside through the body air discharge holes, and a portion of the air is passed through the upper flowing space portion and introduced again into the dry room.

According to the present invention, desirably, the food dehydrator further includes an inner casing disposed spaced apart from the body by a given distance inside the body and having the dry room formed at the internal space thereof, a plurality of inner casing air inlet holes formed on the rear surface corresponding to the air inlet holes, a plurality of first air outlet holes formed on the upper portions of the side surfaces thereof, and a plurality of second air outlet holes formed on the lower portions of the side surfaces thereof.

According to the present invention, desirably, the upper flowing space portion is formed by first air guide members disposed to surround the first air outlet holes so as to guide the air discharged from the first air outlet holes to the inner casing air inlet holes, and the lower flowing space portion is formed by second air guide members disposed to surround the second air outlet holes so as to guide the air discharged from the second air outlet holes to the body air discharge holes.

According to the present invention, desirably, in the space portion between the top surface of the body and the top surface of the inner casing, a control module is disposed to control the operations of the fan and the heating member, and on the top of the external surface of the body, an operating button is disposed connectedly to the control module in such a manner as to exchange signals with each other.

According to the present invention, desirably, a light source is disposed in the space portion between the top surface of the body and the top surface of the inner casing, and a rounded square light slot is formed on the center portion of the top of the external surface of the body so as to allow the light generated from the light source to be seen to the outside.

According to the present invention, desirably, a plurality of stepped protrusions is formed by height on the inner side surfaces of the inner casing so as to receive and support a plurality of dry stands on which the food is placed.

According to the present invention, desirably, an inner plate made of stainless steel is disposed on the inner surface of the front door.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Figure 1:
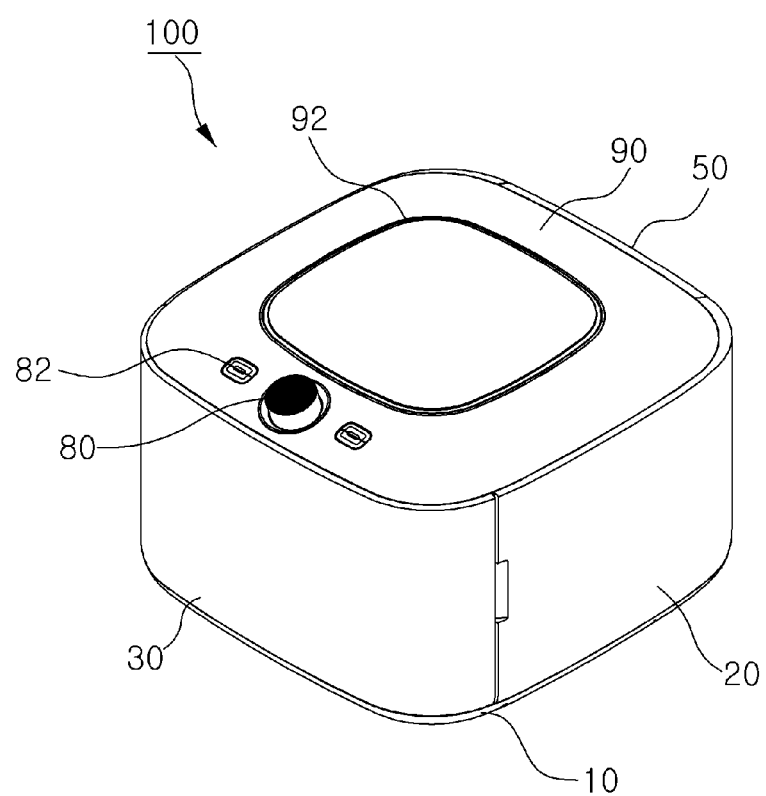
FIG. 1 is a perspective view showing the front side of a food dehydrator according to the present invention.

Hereinafter, a food dehydrator according to the present invention will be in detail explained with reference to the attached drawings.

As shown in FIGS. 1 to 4, a food dehydrator 100 largely includes a body and a front door 30 detachably mounted on the front surface of the body. The body includes a base member 10, the front door 30, side casings 20 disposed on both sides of the front door 30, a rear casing 50 connected between the side casings 20, and a top casing 90 coupled to the top sides of the body and the front door 30. Further, the body has a dry room 21 as will be described later formed at the inside thereof so as to dry food therein.

The base member 10 is located at the bottom of the body and coupled to the front door 30, the side casings 20 and the rear casing 50 along the top ends thereof. Further, the base member 10 has a plurality of body supporters 24 formed spaced apart from each other on the underside thereof so as to allow the base member 10 to be fixedly supported against the floor. A power cable 26 for supplying power to the food dehydrator 100 and a power switch 25 are disposed on the rear surface of the base member 10 corresponding to the rear casing 50. On the other hand, the base member 10 further has a plurality of body air discharge holes 23 formed on the lower portions of the side surfaces thereof so as to discharge the air in the interior of the body, that is, the dry room to the outside of the food dehydrator 100, which will be described later.

The top casing 90 is located at the top of the body and has an operating button 80 mounted thereon so as to select and control various operations. Display panels 82 are disposed on both sides of the operating button 80 so as to display the operating states of the food dehydrator 100. Further, the top casing 90 has a rounded square light slot 92 formed on the center portion thereof. A light source like LED is disposed on the underside of the top casing 90, and accordingly, the light generated from the light source is emitted through the light slot 92. The light source is turned on when the food dehydrator 100 is operated or emits various color light in accordance with the operating states of the food dehydrator 100.

The side casings 20 are located on both sides of the body in such a manner as to be connected to both sides of the front door 30, and the rear casing 50 is located on the rear surface of the body in such a manner as to be connected between the side casings 20.

The rear casing 50 has a plurality of air inlet holes 22 formed thereon so as to introduce external air therethrough.

Figure 2:
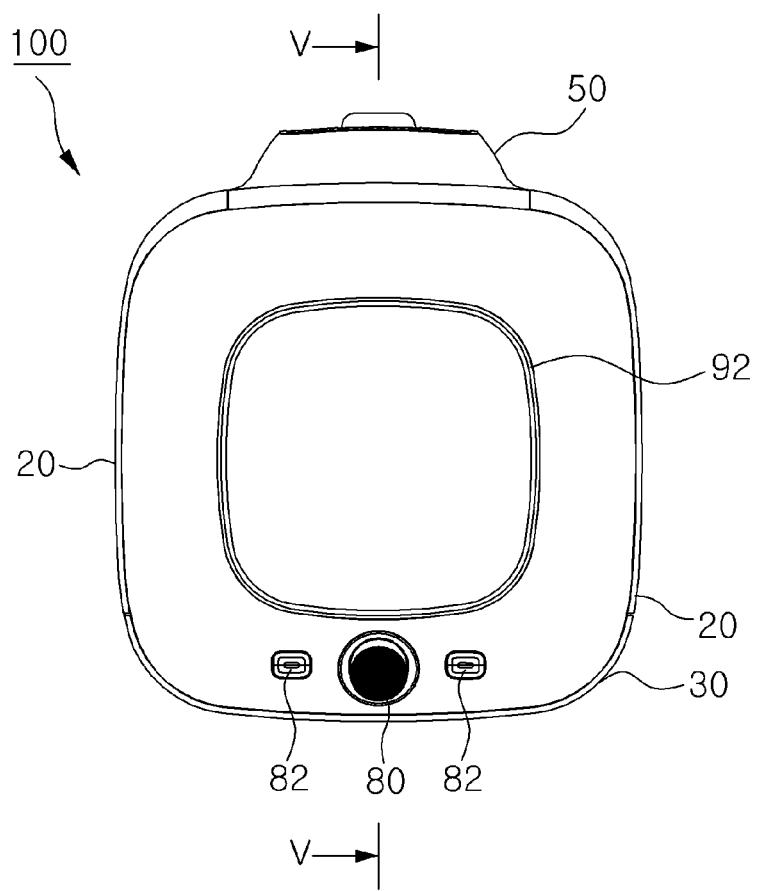
FIG. 2 is a plan view showing the food dehydrator according to the present invention.
Figure 3:
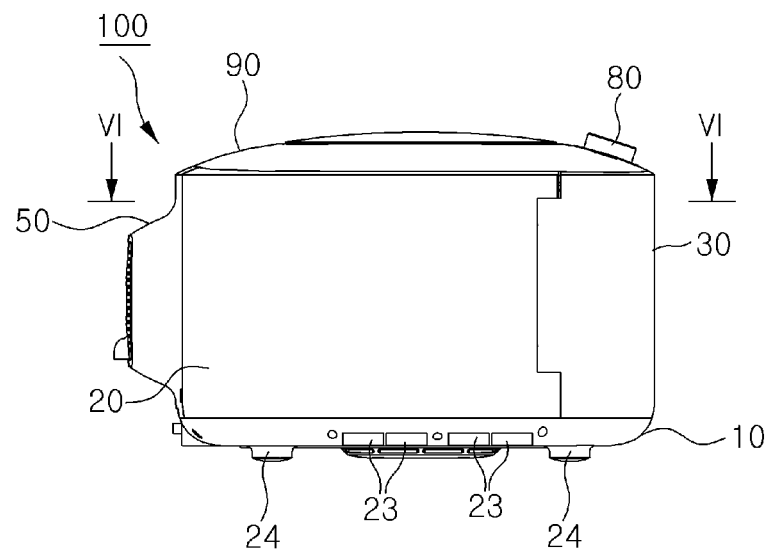
FIG. 3 is a side view showing the food dehydrator according to the present invention.
Figure 4:
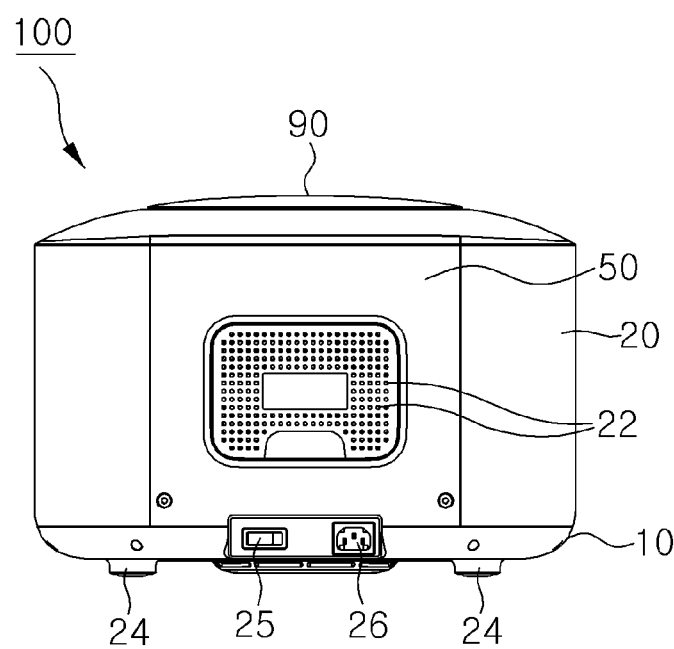
FIG. 4 is a rear view showing the food dehydrator according to the present invention.
Figure 5:
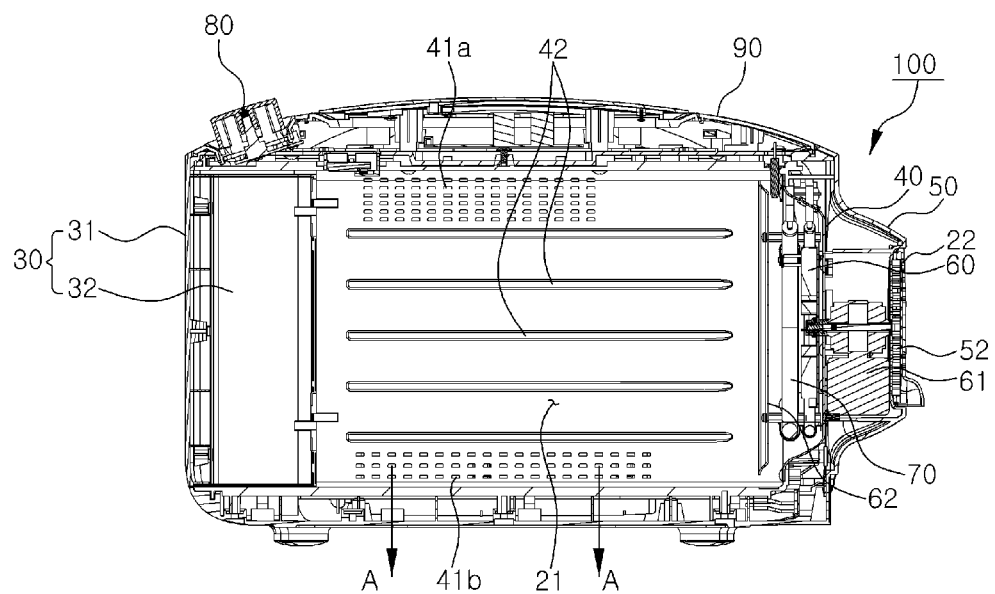
FIG. 5 is a sectional view taken along the line V-V of FIG. 2.
Figure 6:
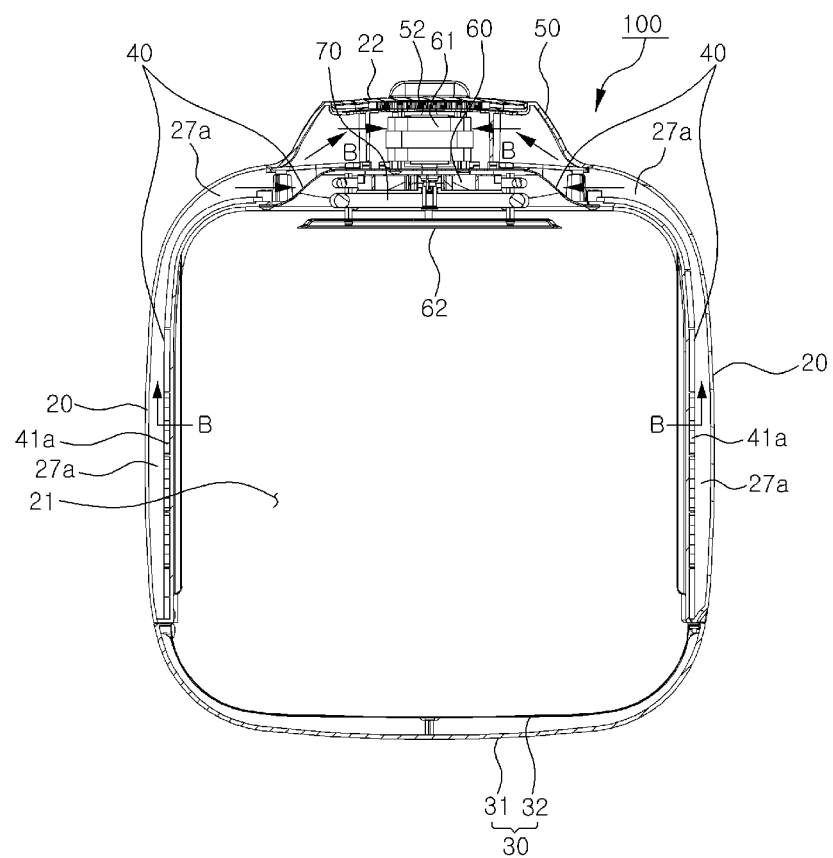
FIG. 6 is a sectional view taken along the line VI-VI of FIG. 3.
Figure 7:
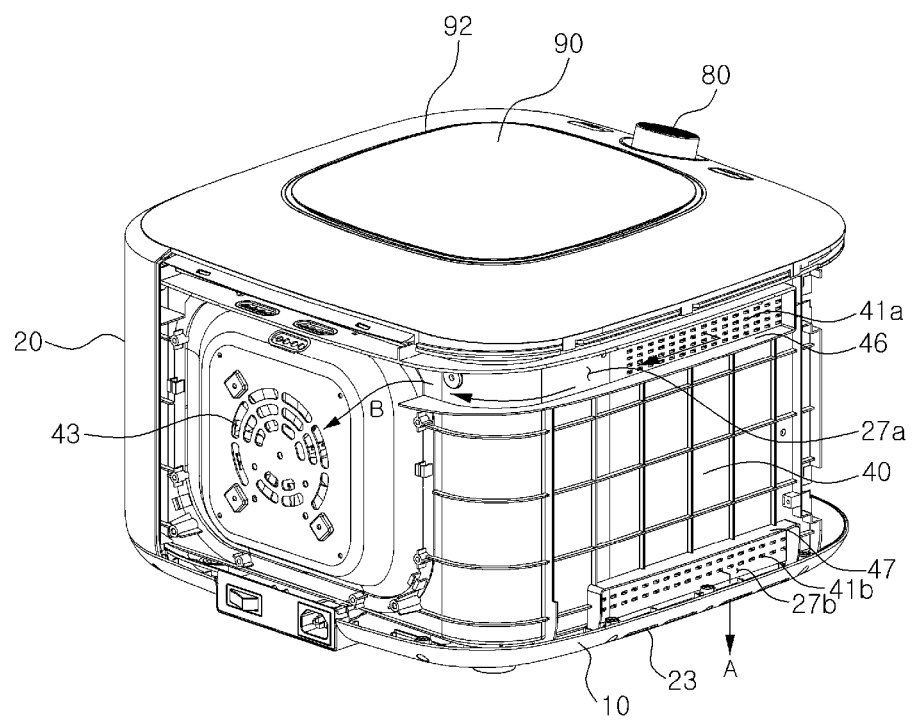
FIG. 7 is a perspective view showing the rear side of the food dehydrator according to the present invention wherein one side casing is removed.

FIG. 5 is a sectional view taken along the line V-V of FIG. 2, FIG. 6 is a sectional view taken along the line VI-VI of FIG. 3, and FIG. 7 is a perspective view showing the rear side of the food dehydrator according to the present invention wherein one side casing is removed. For the brevity of the description, FIG. 7 shows the state wherein a driving motor 61 is removed from an inner casing 40.

As shown in FIGS. 5 to 7, the front door 30 mounted on the front surface of the body serves to open and close the interior of the body, that is, the dry room 21. In this case, the front door 30 is detachably mounted on the body by means of press fitting or a rotary structure wherein one side is rotated by means of a hinge.

The front door 30 has a door casing 31 disposed at the external surface thereof and an inner plate 32 disposed at the inside of the door casing 31. The inner plate 32 is made of reflective stainless steel capable of evenly providing the wavelength of light for the whole food by using the scattered reflection of light. So as to increase the water evaporation effect of food, that is, the inner plate 32 reflects the light emitted from a heating member (lamp) as an internal heat source to allow the molecular movements inside the food to be active, thus enhancing the water evaporation effect to the outside.

The dry room 21 wherein food is dried is formed inside the body, and the inner casing 40 is disposed spaced apart from the top casing 90, the base member 10, the side casings 20 and the rear casing 50 constituting the body by a given distance, thus partitioning the dry room 21 from the body. That is, the internal space in the inner casing 40 becomes the dry room 21. The inner casing 40 has a plurality of inner casing air inlet holes 43 formed on the rear surface corresponding to the air inlet holes 22 of the rear casing 50.

A driving motor 61 is mounted on the outside of the rear surface of the inner casing 40. That is, the driving motor 61 is disposed on the space between the rear casing 50 and the inner casing 40. A shaft of the driving motor 61 is passed through the inner casing 40, and a fan 60 is disposed on the inside of the rear surface of the inner casing 40 and coupled to the shaft of the driving motor 61 in such a manner as to be operated by means of the driving motor 61. Further, a heating member 70 is located in front of the fan 60 (toward the dry room 21), and a fan guide 62 is located in front of the heating member 70 so as to guide the flow of air induced by the fan 60.

Accordingly, external air is passed through the air inlet holes 22 and the inner casing air inlet holes 43 by means of the operation of the fan 60 upon the activation of the driving motor 61, heated by means of the heating member 70, and then introduced into the dry room 21.

A filter 52 is mounted on the inner surface of the rear casing 50 corresponding to the air inlet holes 22, and the air introduced into the body is filtered by means of the filter 52.

In this case, the filter 52 is selected from the well-known filters, and a separate explanation on the filter 52 will be avoided.

The heating member 70 is located in front of the fan 60 and serves to heat the air supplied through the fan 60 and supply the heated air to the dry room 21, thus allowing the food placed in the dry room 21 to be dried. In this case, the heating member 70 is selected from well-known various heat sources, such as an infrared lamp, a halogen lamp, a carbon lamp, a nichrome wire, and a sheath heater, or the combination thereof.

As mentioned above, the inner casing 40 and the body are spaced apart from each other by the given distance and thus have a given space portion therebetween. That is, a control module (PCB and the like) controlling the operations of the driving motor 61 and the heating member 70 is disposed in the space portion between the top casing 90 and the top of the inner casing 40, and accordingly, the operating button 80 is disposed on the top of the external surface of the body and connected to the control module in such a manner as to exchange signals with each other. Further, a power supply device, which receives power from the outside and supplies the power to the food dehydrator 100, is disposed in the space portion between the base member 10 and the underside of the inner casing 40.

The inner casing 40 has a plurality of first air outlet holes 41a formed on the upper portions of the side surfaces thereof and a plurality of second air outlet holes 41b formed on the lower portions of the side surfaces thereof. A plurality of stepped protrusions 42 is formed by height on the inner side surfaces of the inner casing 40, that is, between the first air outlet holes 41a and the second air outlet holes 41b, so as to receive and support a plurality of dry stands (not shown) on which the food to be dried is placed. According to the present invention, the stepped protrusions 42 are formed only between the first air outlet holes 41a and the second air outlet holes 41b, but of course, they may be formed on the positions wherein the first air outlet holes 41a and the second air outlet holes 41b are formed.

On the other hand, the inner casing 40 has first air guide members 46 protruding from the upper portion of each external side surface thereof and second air guide members 47 protruding from the lower portion of each external surface thereof.

The first air guide members 46 are disposed in parallel with the top and bottom portions of the first air outlet holes 41a so as to surround the first air outlet holes 41a and then extended up to the rear surface of the inner casing 40 corresponding to the rear casing 50. Further, the ends of the first air guide members 46 come into contact with the inner surfaces of the side casings 20. Thus, an upper flowing space portion 27a is formed between the inner casing 40 and each side casing 20 by means of the first air guide members 46.

Accordingly, as shown by arrows B in FIGS. 6 and 7, the air discharged from the first air outlet holes 41a within the air in the dry room 21 is passed through the upper flowing space portion 27a formed by the first air guide members 46 and moved toward the rear surface of the inner casing 40. Next, the air is introduced into the dry room 21 through the inner casing air inlet holes 43. At this time, when the air discharged from the dry room 21 is introduced into the inner casing air inlet holes 43, it is mixed with the external air introduced through the air inlet holes 22 of the rear casing 50.

The second air guide members 47 protrude from both sides and top of the second air outlet holes 41b so as to surround the second air outlet holes 41b. Further, the ends of the second air guide members 47 come into contact with the inner surfaces of the side casings 20. Thus, a lower flowing space portion 27b is formed between the inner casing 40 and each side casing 20 by means of the second air guide members 47.

Accordingly, as shown by arrows A in FIGS. 5 and 7, the air discharged from the second air outlet holes 41b within the air in the dry room 21 is passed through the lower flowing space portion 27b formed by the second air guide member 47 and introduced into the base member 10 located thereunder. Next, the air is discharged to the outside of the body through the body air discharge holes 23.

Under the above-mentioned configuration, an explanation on the operation of the food dehydrator 100 according to the present invention will be given.

First, the front door 30 disposed on the front surface of the body is open to open the inside of the food dehydrator 100, and next, the dry stands on which the food to be dried is placed are inserted into the dry room 21. After that, the front door 30 is closed to close the inside of the food dehydrator 100.

Next, if the operating button 80 is manipulated to adjust a dry temperature, dry time, kinds of food and the like, external air is passed through the air inlet holes 22 of the rear casing 50 and the inner casing air inlet holes 43 of the inner casing 40 sequentially by means of the operation of the fan 60 caused by the activation of the driving motor 61 and then introduced into the dry room 21. Next, the introduced air is passed through the heating member 70 and heated to dry air. After that, the dry air is moved forwardly to dry the food placed on the dry stands.

In this case, as the air in the dry room 21 evaporates water from the food, it becomes in a state of wet steam, and a small amount of the air can be discharged to the outside through the gap between the front door 30 and the body.

On the other hand, the heavy wet steam containing a large amount of water in the wet steam in the dry room 21 is moved downwardly by means of its gravity and then escaped from the dry room 21 through the second air outlet holes 41b of the inner casing 40, as shown by arrows A. Next, the heavy wet steam is passed through the lower flowing space portion 27b and discharged to the outside through the body air discharge holes 23 of the base member 10.

Further, the remaining relatively light wet steam in the wet steam in the dry room 21 is escaped from the dry room 21 through the first air outlet holes 41a of the inner casing 40, as shown by arrows A, and moved through the upper flowing space portion 27a to the rear surface. Next, the relatively light wet steam is passed through the inner casing air inlet holes 43 of the inner casing 40 and introduced again into the dry room 21. That is, the wet steam escaped from the dry room 21 is passed through the upper flowing space portion 27a and the heating member 70 and then heated again, thus becoming high temperature dry air. The high temperature dry air is introduced again into the dry room 21 and evaporates the water remaining in the dry room 21. The above-mentioned processes are repeatedly conducted to completely evaporate the water contained in the food put in the dry room 21.

As mentioned above, the food dehydrator according to the present invention adopts an air flowing system wherein air is introduced from the rear surface in such a manner as to be moved forwardly and circulates a portion of the wet steam discharged from the dry room to the dry room again, without discharging to the outside, thus providing a good quality of drying, excellent drying efficiencies, and substantially reduced power consumption.

That is, since the air inlet holes through which external air is introduced and the heat source (heating member) are formed on the rear side of the food dehydrator according to the present invention, the high temperature dry air is supplied from the rear side to the front side, thus solving the problem occurring in the existing vertical laminated dry stands wherein as the steps of the dry stands are increased, the dry efficiency becomes reduced. Accordingly, a good quality of drying is ensured. Further, a portion of the high temperature wet steam is circulated between the body and the inner casing, without being discharged to the outside, thus obtaining the insulation effect from the outside of the body, minimizing heat loss to prevent the evaporation temperature in the dry room from being escaped to the outside, and helping water evaporation. Additionally, the high temperature wet steam is heated and used again, thus remarkably reducing the amount of power consumed.

According to the present invention, furthermore, the inner plate made of stainless steel is disposed on the inner side of the front door so as to evenly provide the wavelength of light for the whole food by using the scattered reflection of light generated from the heating member, thus enhancing the dry efficiency.

The present invention may be embodied in other specific forms without departing from its spirit or essential characteristics. The described embodiments are to be considerable in all respects only as illustrative and not restrictive. The scope of the invention is, therefore, indicated by the appended claims rather than by the foregoing description. All changed which come within the meaning and range of equivalency of the claims are to be embraced within their scope.

What is claimed is:
1. A food dehydrator comprising:
a body having a front door, a rear face opposite to the front door, side faces between the front door and the rear face, a bottom face and a top face opposite to the bottom face, a plurality of air inlet holes being formed on the rear face so as to introduce external air therethrough, and a plurality of body air discharge holes being formed on lower portions of the side faces so as to discharge internal air to the outside therethrough;
an inner casing disposed inside the body and having a dry room formed at an internal space of the inner casing, the inner casing including a front surface, a rear surface, side surfaces, a bottom surface and a top surface, which respectively face and correspond to the front door, the rear face, the side faces, the bottom face and the top face of the body,
a plurality of inner casing air inlet holes formed on the rear surface of the inner casing corresponding to the air inlet holes, a plurality of first air outlet holes formed on upper portions of the side surfaces of the inner casing, and a plurality of second air outlet holes formed on lower portions of the side surfaces of the inner casing;
first air guide walls protruding from and extending along the side surfaces and the rear surface of the inner casing, wherein the first air guide walls define an upper flowing space portion between the inner casing and the body bordered by the first air guide walls, and air discharged from the first air outlet holes is guided via the upper flowing space portion to the inner casing air inlet holes on the rear surface of the inner casing;

second air guide walls protruding from the side surfaces, wherein the second air guide walls define a lower flowing space portion between the inner casing and the body bordered by the second air guide walls, and air discharged from the second air outlet holes is guided via the lower flowing space portion to the body air discharge holes;

a fan operated by means of a driving motor so as to supply the external air to the dry room; and a heating member disposed behind the fan along an air flowing path so as to heat the air supplied to the dry room.

2. The food dehydrator according to claim 1, wherein the driving motor is disposed in a space portion between the rear face of the body and the rear surface of the inner casing, and the fan and the heating member are disposed in the dry room at positions corresponding to the inner casing air inlet holes of the inner casing.

3. The food dehydrator according to claim 1, wherein on an external surface of the top face of the body, an operating button is disposed.

4. The food dehydrator according to claim 3, wherein a rounded square light slot is formed on a center portion of the external surface of the top face of the body.

5. The food dehydrator according to claim 1, wherein the front door includes an inner plate made of stainless steel.

6. The food dehydrator according to claim 1, wherein a filter is mounted on an inner surface of the body corresponding to the air inlet holes so as to remove foreign matters from the introduced air.

7. The food dehydrator according to claim 1, wherein the heating member comprises at least any one of an infrared lamp, a halogen lamp, a carbon lamp, a nichrome wire, and a sheath heater.

8. The food dehydrator according to claim 1, wherein the first air guide walls include a pair of walls, which extend from one of the side surfaces to the rear surface of the inner casing while being spaced apart from and in parallel with each other, and a connecting wall, which protrudes from said one of the side surfaces and connects the pair of walls each other, such that the upper flowing space portion, defined by the pair of walls and the connecting wall, is formed to extend from said one of the side surfaces to the rear surface, the upper flowing space portion having two opposite ends, one of which is closed and blocked by the connecting wall and another of which is open to connect to a space on the rear surface.

* * * * *